(12) United States Patent
von Wenz

(10) Patent No.: US 7,059,774 B2
(45) Date of Patent: Jun. 13, 2006

(54) PLAIN BEARING BUSH

(75) Inventor: Volker von Wenz, Saarbrücken (DE)

(73) Assignee: AB SKF, Gothenburg (SE)

( * ) Notice: Subject to any disclaimer, the term of this patent is extended or adjusted under 35 U.S.C. 154(b) by 41 days.

(21) Appl. No.: 10/758,124

(22) Filed: Jan. 16, 2004

(65) Prior Publication Data

US 2004/0208407 A1    Oct. 21, 2004

(30) Foreign Application Priority Data

Jan. 21, 2003    (DE)    ........................... 203 00 854 U

(51) Int. Cl.
*F16C 17/02*    (2006.01)
(52) U.S. Cl. .................................... 384/285
(58) Field of Classification Search ................ 384/285, 384/528, 287, 288, 291
See application file for complete search history.

(56) References Cited

U.S. PATENT DOCUMENTS

| | | | |
|---|---|---|---|
| 824,628 A | 6/1906 | Curtis | |
| 1,996,841 A * | 4/1935 | Stevens | 384/527 |
| 3,729,347 A * | 4/1973 | Brown et al. | 75/255 |
| 5,322,372 A * | 6/1994 | You | 384/293 |

FOREIGN PATENT DOCUMENTS

| | | |
|---|---|---|
| DE | 1 910 692 | 4/1970 |
| DE | 2 234 428 | 1/1974 |
| DE | 29 13 708 A1 | 10/1980 |
| DE | 80 20 524 U | 10/1980 |
| DE | 33 26 316 A1 | 2/1985 |
| JP | 60184711 A | 9/1985 |

OTHER PUBLICATIONS

Product Brochure; Glacier IHG; PL 001-01-96-D; pp. 12,14, Mar. 1996.

* cited by examiner

*Primary Examiner*—Lenard A. Footland
(74) *Attorney, Agent, or Firm*—Buchanan Ingersoll

(57) ABSTRACT

A plain bearing bush possesses a hollow cylindrical shape and includes a first hollow cylindrical part of a first material and a second hollow cylindrical part of a second material, with the second hollow cylindrical part being coaxially surrounded by the first hollow cylindrical part. One of the first and second materials is a plain bearing material and the other of the first and second materials is a high-strength material. A plurality of through holes penetrate both the first hollow cylindrical part and the second hollow cylindrical part, with the through holes each having an axis arranged perpendicular to the longitudinal axis of the hollow cylindrical shape.

17 Claims, 1 Drawing Sheet

PLAIN BEARING BUSH

This application is based on and claims priority under 35 U.S.C. § 119 with respect to German Application No. 203 00 854.5 filed on Jan. 21, 2003 the entire content of which is incorporated herein by reference.

FIELD OF THE INVENTION

The invention relates to a plain bearing bush with an essentially hollow cylindrical shape.

BACKGROUND OF THE INVENTION

Plain bearing bushes for use in connection with the frictional bearing of rotating components are known. For example, German Offenlegungsschrift No. DE 29 13 708 A1 discloses a bearing bush with lubricant pockets made in the supporting running surface. The bearing bush has an essentially hollow cylindrical shape, with the material which is displaced when the lubricating pockets are shaped forming cams projecting on the outside jacket of the bearing bush.

A similar approach is known from German Offenlegungsschrift No. DE 33 26 316 A1. This document discloses a sintered metal bearing bush with lubricant pockets, wherein recesses are provided for holding lubricants on the running surface which lies inside.

Diverse similar approaches are also known, reference being made by way of example to German Offenlegungsschrift No. DE 2 234 428 A1, German Offenlegungsschrift No. DE 1 910 692 A1 and U.S. Pat. No. 824,628.

In the production of these plain bearing bushes, it is desirable to produce a bearing bush characterized by a long service life, with the production of the bearing bush being as relatively simple and economical as possible.

In the studies of rolled cylindrical bushes of bronze, as per DIN 1949 (ISO 3547), in the version with rhombic lubrication pockets, it has been found that after initial greasing under a load of roughly 40 N/mm$^2$ with oscillating motion and a unilateral load direction, the end of the service life is reached early if there is no regreasing after roughly 24 hours of testing.

Under otherwise identical conditions, if rolled bronze bushes were used which are provided with a blanket pattern of through holes instead of rhombic pockets, a regreasing period of roughly 48 hours was sufficient to prevent a premature end of the service life.

If this test is carried out with identically perforated bushes which consist of steel and in addition to nitriding have manganese-phosphatizing of the surface, test times of more than 1300 hours without further regreasing were reached. The repetition of this test with the described steel bushes and a pressure of roughly 60 N/mm$^2$ showed a comparatively disappointing result with only roughly more than 5000 m of sliding path until failure.

Other tests with composite bushes using polyacetal (material group P2 as per DIN 1494) disclosed that these bushes attain slide paths of more than 6000 m until failure without any initial lubrication even when running dry at a pressure of 100 N/mm$^2$.

SUMMARY OF THE INVENTION

One aspect of the invention involves a plain bearing bush having a hollow cylindrical shape. The hollow cylindrical shape is defined by two hollow cylindrical parts made of different materials. The two parts include a first hollow cylindrical part of a first material and a second hollow cylindrical part of a second material. The second part is coaxially surrounded by the first part. One of the two materials is a plain bearing material and the other material is a high-strength material. In addition, a number of holes penetrate both the first hollow cylindrical part and the second hollow cylindrical part, and their axes are perpendicular to the axis of the hollow cylinder formed by the two parts.

The plain bearing material preferably has polyacetal or consists of polyacetal, and the high-strength material is preferably steel. In addition, the holes viewed in the circumferential direction are preferably arranged axially offset. They are thus arranged such that the holes in the first and in the second hollow cylindrical part are flush with one another.

BRIEF DESCRIPTION OF THE DRAWING FIGURES

The features and characteristics of the present invention will become more apparent from the following detailed description considered with reference to the accompanying drawing figures in which like reference numerals designate like elements.

DETAILED DESCRIPTION

Figure 1:
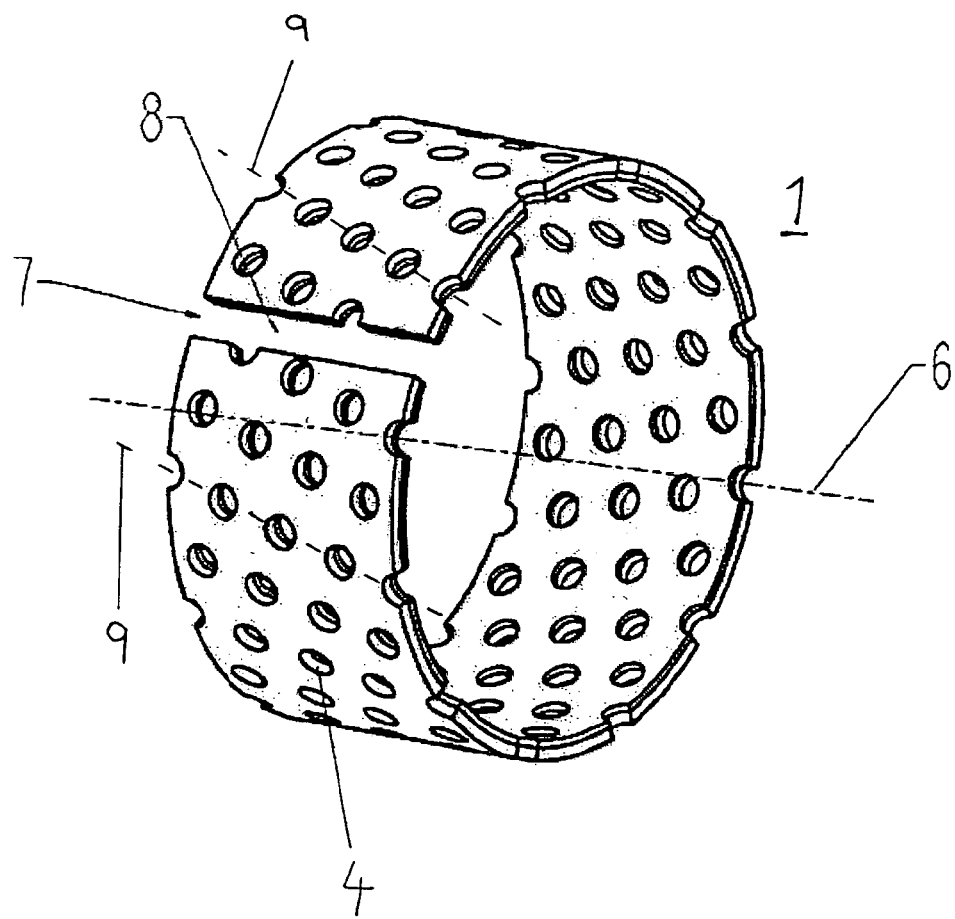
FIG. 1 is a perspective view of a plain bearing bush according to the present invention.
Figure 2:
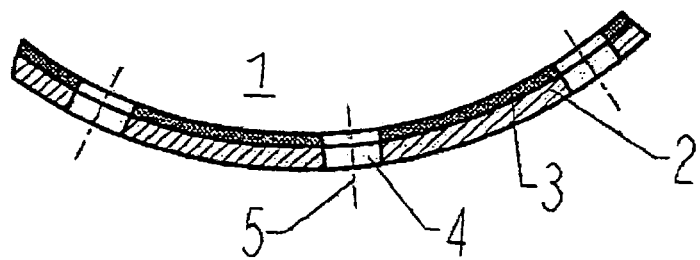
FIG. 2 is an enlarged cross-sectional view of the plain bearing bush shown in FIG. 1 taken along a section line perpendicular to the axis of the hollow-cylinder.

Referring to FIGS. 1 and 2, the plain bearing bush 1 is defined by a hollow cylinder comprised of two hollow cylindrical parts. The two hollow cylindrical parts illustrated in the drawing figures include a first hollow cylindrical part 2 and a second hollow cylindrical part 3. The second hollow cylindrical part 3 is completely surrounded by the first hollow cylindrical part 2.

The two hollow cylindrical parts 2, 3 are arranged coaxially around the longitudinal axis 6 of the hollow cylinder. The hollow cylindrical parts 2, 3 are provided with a plurality of holes forming through holes 4 in the hollow cylinder or plain bearing bush 1. The axes 5 of the holes 4 are perpendicular the longitudinal axis 6. These holes are machined into the plain bearing bush 1 flush through the two parts 2, 3, as best illustrated in FIG. 2. Thus, the through holes in the two hollow cylindrical parts 2, 3 are aligned with one another.

It can be seen from FIG. 1 that the plain bearing bush 1 at one circumferential point 7 has a slot 8 which makes it possible for the plain bearing bush 1 to be adapted in its radial inside dimension.

According to the disclosed embodiment, the first hollow cylindrical part 2 consists of high-strength material while the second hollow cylindrical part 3 consist of plain bearing material. The plain bearing material preferably has polyacetal or consists of such material. On the other hand, high-strength material for the first cylindrical part is preferably steel.

A thin polyacetal layer of the plain bearing bush prevents scoring phenomena by surface contact of the shaft and the bush. The steel back prevents plastic deformation of the thin-walled bush to far beyond a pressure of roughly 120 N/mm$^2$. Conventionally, plastic deformation of bronze bushes begins at a pressure of roughly 40 N/mm$^2$.

In another respect, the sum of the volumes of the through holes 4 in the hollow cylinder constitutes a stowage space for a rather large grease reserve. This thus enables a long operating time interval without regreasing.

If composite bushes which can be used in dry running under higher loads with polyacetal are provided with greasing which greatly prolongs the service life by outfitting with through holes, a bearing is obtained which is superior to the described versions which have been examined previously with respect to service life without regreasing and with respect to its load bearing capacity.

Moreover composite bushes of polyacetal can be produced much more economically compared to the other studied versions. The proposed version with through holes leads only to low additional costs for punching the hole pattern., In doing so, the same tools can be used as those used for perforating the initially mentioned perforated bronze bushes.

As mentioned above, the plain bearing bush is provided with through holes. In the illustrated embodiment, these through holes, viewed in the circumferential direction, are arranged axially offset. That is, as seen with reference to FIG. 1, the through holes (at least two adjacent holes) are arranged along lines 9 that are axially offset relative to the axis 6 (i.e., not parallel to the axis 6). The holes are arranged such that the holes in the first and in the second hollow cylindrical part are flush with one another.

The described and illustrated version of the plain bearing bush combines in an extremely advantageous manner known measures and leads to a plain bearing bush which can be rather economically produced while still having a relatively long service life with generally low maintenance cost.

The principles and preferred embodiment of the present invention have been described in the foregoing specification. However, the invention which is intended to be protected is not to be construed as limited to the particular embodiment disclosed. The embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A plain bearing bush possessing a hollow cylindrical shape with a longitudinal axis, comprising:
    a first hollow cylindrical part of a first material;
    a second hollow cylindrical part of a second material different from the first material;
    the second hollow cylindrical part being coaxially surrounded by the first hollow cylindrical part;
    one of the first and second materials being a plain bearing material and the other of the first and second materials being steel;
    a plurality of through holes penetrating both the first hollow cylindrical part and the second hollow cylindrical part; and
    the through holes each having an axis, with the axis of each of the plurality of through holes being perpendicular to the longitudinal axis of the hollow cylindrical shape.

2. The plain bearing bush as claimed in claim 1, wherein the plain bearing material contains polyacetal or consists of polyacetal.

3. The plain bearing bush as claimed in claim 1, wherein the first hollow cylindrical part and the second hollow cylindrical part have a slot at one circumferential point.

4. The plain bearing bush as claimed in claim 1, wherein the first hollow cylindrical part is made of steel and the second hollow cylindrical part is made of the plain bearing material.

5. The plain bearing bush as claimed in claim 4, wherein the plain bearing bush includes a central axis and the through holes are arranged along lines which cross axial ends of the plain bearing bush and are not parallel to the central axis.

6. The plain bearing bush as claimed in claim 5, wherein the first hollow cylindrical part and the second hollow cylindrical part have a slot at one circumferential point.

7. The plain bearing bush as claimed in claim 4, wherein the first hollow cylindrical part and the second hollow cylindrical part have a slot at one circumferential point.

8. A plain bearing bush in a form of a hollow cylinder possessing a longitudinal axis, the plain bearing bush comprising:
    a first hollow cylindrical part;
    a second hollow cylindrical part;
    the first hollow cylindrical part and the second hollow cylindrical part being coaxial with respect to the longitudinal axis of the hollow cylinder;
    the first hollow cylindrical part surrounding the second hollow cylindrical part;
    the first hollow cylindrical part and the second hollow cylindrical part being made of different materials;
    wherein the material of which the first hollow cylindrical part is made contains polyacetal or consists of polyacetal;
    the first hollow cylindrical part being provided with a plurality of through holes;
    the second hollow cylindrical part being provided with a plurality of through holes;
    the through holes in the first hollow cylindrical part being aligned with the through holes in the second hollow cylindrical part to form through holes in the hollow cylinder which each have a hole axis;
    at least two of the through holes in the hollow cylinder being arranged along a line that crosses axial ends of the plain bearing bush; and
    the hole axes being perpendicular to the longitudinal axis of the hollow cylinder.

9. The plain bearing bush as claimed in claim 8, wherein the first hollow cylindrical part and the second hollow cylindrical part have a slot at one circumferential point.

10. The plain bearing bush as claimed in claim 8, wherein the plain bearing bush includes a central axis and the through holes are arranged along lines which cross axial ends of the plain bearing bush and are not parallel to the central axis.

11. The plain bearing bush as claimed in claim 8, wherein the material of which the first hollow cylindrical part is made is steel and the material of which the second hollow cylindrical part is made is plain bearing material.

12. The plain bearing bush as claimed in claim 8, wherein the material of which the second hollow cylindrical part is made is steel.

13. A plain bearing bush possessing a hollow cylindrical shape with a longitudinal axis, comprising:
    a first hollow cylindrical part of a first material;
    a second hollow cylindrical part of a second material different from the first material;
    the second hollow cylindrical part being coaxially surrounded by the first hollow cylindrical part;

one of the first and second materials being a plain bearing material;

wherein the plain bearing material contains polyacetal or consists of polyacetal;

a plurality of through holes penetrating both the first hollow cylindrical part and the second hollow cylindrical part, none of said plurality of through holes receiving a rolling element; and the through holes each having an axis, with the axis of each of the plurality of through holes being perpendicular to the longitudinal axis of the hollow cylindrical shape.

14. The plain bearing bush as claimed in claim 13, wherein the material of which the other of the first and second materials is made is steel.

15. The plain bearing bush as claimed in claim 13, wherein the first hollow cylindrical part is made of steel and the second hollow cylindrical part is made of the plain bearing material.

16. The plain bearing bush as claimed in claim 13, wherein the plain bearing bush includes a central axis and the through holes are arranged along lines which cross axial ends of the plain bearing bush and are not parallel to the central axis.

17. The plain bearing bush as claimed in claim 13, wherein the first hollow cylindrical part and the second hollow cylindrical part have a slot at one circumferential point.

* * * * *

UNITED STATES PATENT AND TRADEMARK OFFICE
CERTIFICATE OF CORRECTION

PATENT NO.        : 7,059,774 B2
APPLICATION NO. : 10/758124
DATED             : June 13, 2006
INVENTOR(S)       : Volker Von Wenz It is certified that error appears in the above-identified patent and that said Letters Patent is hereby corrected as shown below:

On the Title Page; Item (73) Assignee
Please change "Gothenburg" to --Goteborg--.

Signed and Sealed this

Tenth Day of July, 2007

JON W. DUDAS
*Director of the United States Patent and Trademark Office*